Patented Mar. 5, 1935

UNITED STATES PATENT OFFICE 1,993,087

MANUFACTURE OF NEW GREEN SULPHUR DYESTUFFS

Ernest Chapman, Worsley, Manchester, and William Bertram Waddington, Higher Crumpsall, Manchester, England, assignors to Imperial Chemical Industries Limited, a corporation of Great Britain No Drawing. Application July 28, 1933, Serial No. 682,668. In Great Britain August 17, 1932

14 Claims. (Cl. 260—19)

The present invention relates to the manufacture of new green sulphur dyestuffs of particularly good fastness to soap boiling.

According to our invention, we sulphurize, by any of the usual well known methods, indophenols derived from phenyl-1-naphthylamines containing a carboxyl group in the phenyl nucleus and no substituents in the 4-position of the naphthalene ring e. g. from naphthyl-anthranilic acid of the constitution:

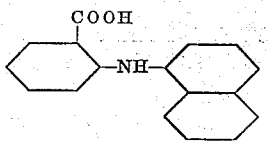

The phenyl and naphthyl groups of the phenyl-1-naphthylamines may contain substituents such as amino and alkyl groups. The resulting new green dyestuffs are of good shade and resist well a boiling soap solution.

The indophenols derived from the phenyl-1-naphthylamines may be prepared by treating an aqueous solution of the same containing a para-aminophenol in the cold with a caustic alkali and an alkali hypochlorite and then adding an alkali sulfide. The para-aminophenols may contain chlorine or alkyl groups as substituents and, when we employ the term "a p-aminophenol", we intend to include such compounds.

The following examples, in which the parts are by weight, illustrate but do not imit our invention.

Example 1

26.3 parts of N-α-naphthylanthranilic acid prepared by the method of Ullmann, Liebig's Annalen 355, 348, and 11 parts of p-aminophenol are dissolved in 700 parts of water, containing 8 parts of sodium hydroxide. The solution is cooled to 0° C. and sodium hypochlorite solution, containing 16 parts of available chlorine, is added at such a rate as to avoid raising the temperature above +4° C. After stirring this solution ten minutes, 35 parts of sodium sulphide crystals, dissolved in the minimum volume of cold water, are added, and the whole is stirred for a further two hours. The solution is then acidified with hydrochloric acid, the leucoindophenol filtered off, and dried, if desired. It forms then a yellow green powder, dissolving in sodium sulphide to a yellow solution which oxidizes in air to a bluish-red solution.

The leucoindophenol is dissolved in a sodium polysulphide solution, made by warming together 127.5 parts of sodium sulphide crystals, 57.5 parts of sulphur and 50 parts of water. 13.4 parts of copper sulphate crystals are added, and the solution is evaporated until an internal temperature of 117° C. is reached. This solution is refluxed at 117° C. until sulphurization is complete i. e. for from 35 to 50 hours. Then 49 parts of water and 29 parts of caustic soda liquor, 70° Tw., are added and the solution is further refluxed until the dyestuff is of the required shade. The dyestuff is then separated, e. g., by blowing air through the diluted solution at 80° C. The separated and dried dyestuff is a very dark green powder, dissolving in sodium sulphide to a yellow green solution from which cotton is dyed in bright green shades of excellent fastness to soap boiling.

Example 2

26.3 parts of N-α-naphthylanthranilic acid and 21.5 parts of 2,6-dichloro-4-aminophenol hydrochloride are dissolved in 700 parts of water containing 12 parts of caustic soda. The solution is cooled to 0° C. and sodium hypochlorite solution, containing 16 parts of available chlorine, is added at such a rate as to avoid raising the temperature above +4° C. After stirring the solution for 15 minutes, 35 parts of sodium sulphide crystals dissolved in the minimum volume of cold water are added and the whole is stirred for a further 2 hours.

The leucoindophenol is then precipitated as the sodium salt by stirring in 240 parts of salt, filtered off and dried, if desired. It forms a dark green powder dissolving in water to a yellow solution which quickly oxidizes to a bluish-red solution.

The preparation of the dyestuff is carried out essentially as described in the preceding example. Chlorine or alkyl substituted p-aminophenols other than the above can also be employed.

Example 3

By replacing the N-α-naphthylanthranilic acid in Example 1 by 30.8 parts of 5-amino-2-α-naphthylamino-benzoic acid, prepared by condensation of 5-nitro-o-chlorobenzoic acid with α-naphthylamine and reduction of the 5-nitro-2-α-naphthylamino-benzoic acid, a yellower shade of green was obtained.

While we have disclosed certain specific embodiments of our invention and the preferred modes of producing our new dyestuffs, it will be readily apparent to those skilled in the art that many variations and modifications may be made therein without departing from the spirit of our

We claim:

1. Process for the manufacture of new green sulphur dyestuffs of good fastness to soap boiling by sulphurizing indophenols derived from a phenyl-1-naphthylamine containing a carboxyl group in the phenyl nucleus and no substituents in the 4-position of the naphthalene ring.

2. The process which comprises the step of reacting a solution of an N-α-naphthyl-anthranilic acid and a p-amino-phenol with caustic alkali and an alkali hypochlorite.

3. The process which comprises the step of reacting a solution of an N-α-naphthyl-anthranilic acid and a p-amino-phenol with caustic alkali and an alkali hypochlorite separating the resulting indophenol and sulphurizing.

4. The process which comprises the step of sulphurizing indophenols derived from a phenyl-1-naphthyl-amine containing a carboxyl group in the phenyl nucleus and devoid of substituents in the 4-position of the naphthalene nucleus.

5. Products obtainable by the process of claim 3.

6. Products obtainable by sulphurizing leuco-indophenols derived from phenyl-1-naphthylamines containing a carboxyl group in the phenyl nucleus and devoid of substituents in the 4-position of the naphthalene nucleus.

7. A leucoindophenol comprising a phenyl-1-naphthylamine containing a carboxyl group in the phenyl nucleus and a p-amino-phenol group in the 4-position of the naphthalene nucleus.

8. An indophenol which upon reduction yields a leucoindophenol comprising a phenyl-1-naphthylamine containing a carboxyl group in the phenyl nucleus and a p-amino-phenol group in the 4-position of the naphthalene nucleus.

9. The process which comprises the step of reacting a solution of N-α-naphthylanthranilic acid and p-amino-phenol with caustic alkali and an alkali hypochlorite, separating the resulting leucoindophenol and sulphurizing.

10. The process which comprises the step of reacting a solution of N-α-naphthylanthranilic acid and 2,6-dichloro-4-aminophenol hydrochloride with caustic alkali and an alkali hypochlorite, separating the resulting leucoindophenol and sulphurizing.

11. The process which comprises the step of reacting a solution of 5-amino-2-α-naphthyl-amino-benzoic acid and p-amino-phenol with caustic alkali and an alkali hypochlorite, separating the resulting leucoindophenol and sulphurizing.

12. The product obtainable by the process of claim 9.

13. The product obtainable by the process of claim 10.

14. The product obtainable by the process of claim 11.

ERNEST CHAPMAN.
WILLIAM BERTRAM WADDINGTON.